INVENTOR.
DIRAN YAZEJIAN
BY
ATTORNEY

INVENTOR.
DIRAN YAZEJIAN
BY
ATTORNEY

Feb. 17, 1970  D. YAZEJIAN  3,495,673
VEHICLE BODY ACCESSORY
Filed Aug. 9, 1967  3 Sheets-Sheet 3

INVENTOR.
DIRAN YAZEJIAN
BY
ATTORNEY

UNITED STATES PATENT OFFICE 3,495,673
Patented Feb. 17, 1970

1

3,495,673
VEHICLE BODY ACCESSORY
Diran Yazejian, 4639 Fenwick, Warren, Mich. 48092
Filed Aug. 9, 1967, Ser. No. 659,408
Int. Cl. B60k 9/00; B62d 27/00
U.S. Cl. 180—64                                    9 Claims

ABSTRACT OF THE DISCLOSURE

A panel member having a body portion adapted to be secured to a cooperating panel of a vehicular body is provided with a contoured outwardly flaring section which is intended to be placed in general alignment with a cooperating decorative member, such as an exposed vehicular exhaust pipe shield, in order to provide a visual transition from the cooperating vehicle body panel to the exhaust pipe shield.

BACKGROUND OF THE INVENTION

A considerable number of automotive vehicles, including those often referred to as "sports cars," are of a design permitting the use of dual engine exhaust pipes placed so as to be generally outboard on opposite sides of the vehicle and generally at a height which is below the lower edge of the vehicle doors. In such situations, the usual arrangement is that the exhaust pipe assembly is formed and attached to the vehicle so that it extends, usually in the vicinity of the front fender, outwardly beyond the normal contour of the vehicle body and then continues, generally horizontally, to a point in proximity to the rear wheels of the vehicle. Often, tubular-like shields, which may also be decorative, are secured to the vehicle in a manner so as to substantially cover the horizontal portion of the otherwise totally exposed exhaust pipe. Such shields are, of course, effective in that they usually preclude the possibility of having anyone unintentionally touch the hot exhaust pipes. However, the tubular-like shields do not provide for an aesthetically pleasing transition from the normal body contour of the vehicle to the contour of the shield itself.

SUMMARY OF THE INVENTION

The present invention comprises a panel member formed so as to be adapted for application to a vehicle body in a manner so as to convey the impression of an apparent joining with, for example, an exhaust pipe shield in order to form an aesthetically pleasing transition from the vehicle body panel to the exhaust pipe shield. The panel members of the invention when secured to the vehicle body panel creates the visual impression that the said vehicle body panel was originally formed in a contour which would accept such exhaust pipe assemblies mounted outboard of the vehicle body.

Accordingly, an object of this invention is to provide panel means adapted to be secured to automotive vehicles in order to provide a transitional contour from the otherwise normal contour of the vehicle to that of an associated exposed vehicle engine exhaust pipe system.

Another object of this invention is to provide an applique-like panel member of a contour which both is at least susceptible to conforming to a cooperating vehicle body panel and provides a transition between such a body panel and an exhaust pipe shield.

Other objects and advantages of this invention will become apparent when reference is made to the following description considered in conjunction with the drawings.

DESCRIPTION OF THE DRAWINGS

In the accompanying drawings.

DESCRIPTION OF THE PREFERRED EMBODIMENTS

Figure 1:
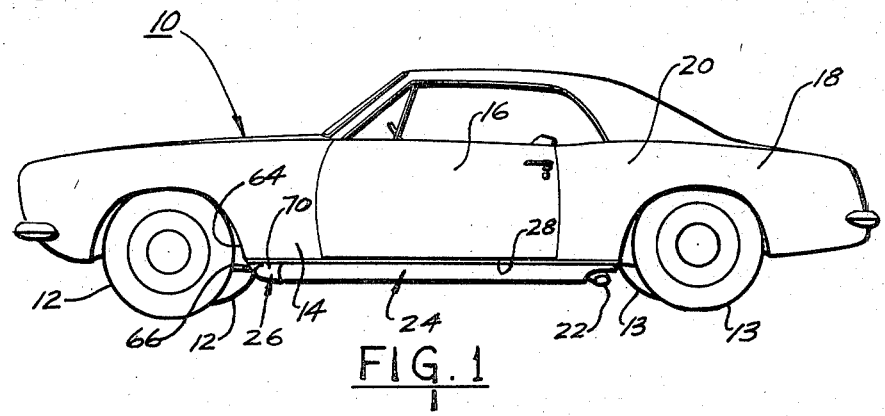
FIGURE 1 is a side elevational view of an automotive vehicle equipped with a transition panel according to the invention.

Referring now in greater detail to the drawings, FIGURE 1 illustrates a vehicle 10 having ground-engaging wheels 12, 13, a front fender panel 14, a door panel 16, a rear fender 18 and quarter-panel portion 20. The vehicle 10 is also equipped with an engine exhaust pipe assembly 21 having its outlet end 22 positioned so as to be at a level generally beneath the door panel 16 and slightly forward of the rear ground-engaging wheels 13. An exhaust pipe assembly shield 24 and a transition panel member 26 are suitably secured to the vehicle 10 in order to provide an aesthetically pleasing appearance of the vehicle 10 while also serving a function of protecting persons from direct contact with the exhaust pipe assembly which may be at temperatures sufficiently high to inflict burns upon anyone touching the exhaust pipe assembly.

Figure 2:
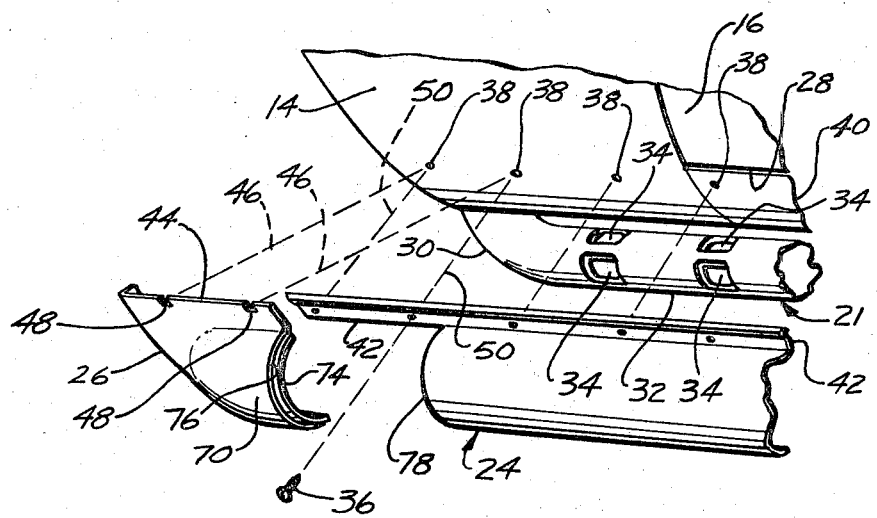
FIGURE 2 is an enlarged fragmentary view, in perspective, of a portion of FIGURE 1 with parts thereof illustrated in "exploded" fashion.
Figure 4:
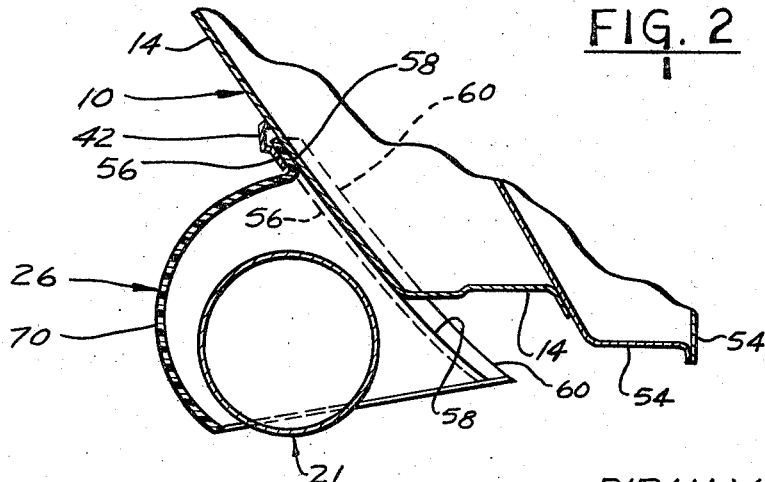
FIGURE 4 is a cross-sectional view taken generally on the plane of line 4—4 of FIGURE 3 and looking in the direction of the arrows.
Figure 3:
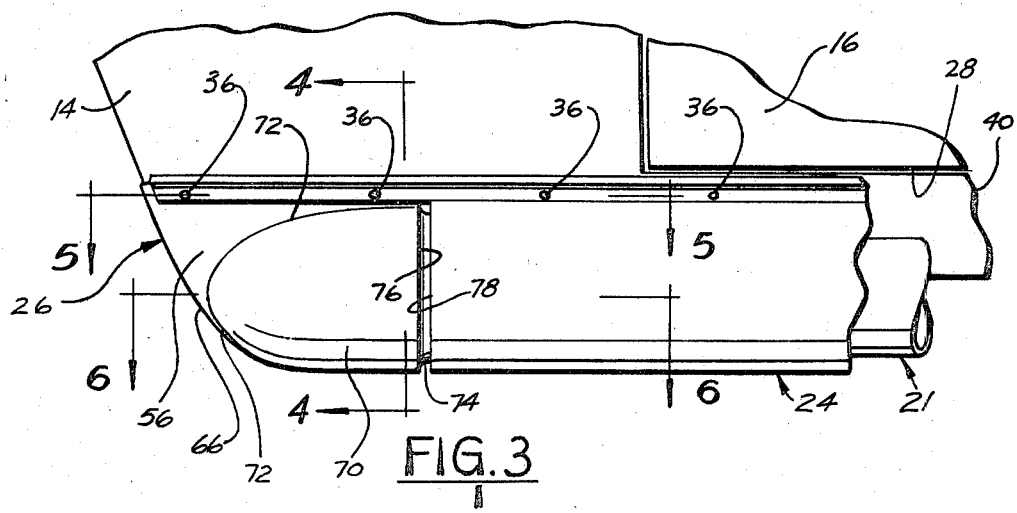
FIGURE 3 is an enlarged fragmentary side elevational view of a portion of FIGURE 1 illustrating in greater detail the assembled arrangement of the cooperating elements shown, for example, in FIGURE 2.

As can be seen from FIGURES 2, 3 and 4, the exhaust pipe assembly 21 is often situated so as to be generally beneath the lower edge 28 of the door 16 and generally outboard of the vehicle. That is, as seen in FIGURE 2, the exhaust pipe assembly 21 may be provided with an elbow-like portion 30 leading from the vehicle engine and connected or, as illustrated, integrally formed with an exhaust muffler section 32. The muffling function may be accomplished by a series of indentations 34 which serve to form muffling chambers therebetween.

As illustrated in FIGURE 2, one method of applying both the shield 24 and the transition panel 26 to the vehicle 10 is my means of screws one of which is shown at 36. That is, suitable screw-engaging holes 38 may be formed in the front fender panel 14 as well as along a door sill or rocker panel 40. In situations where the shield has a longitudinal flange 42 and it is desired to extend the flange 42 over the upper edge 44 of transistion panel 26, the panel 26 is first applied against the front fender portion 14 in the direction indicated generally by the dash-lines 46 so as to have the screw-receiving openings 48 in panel 26 in general alignment with holes 38. The shield 24 is then applied, generally in the direction of dash-lines 50, so as to have the extending portion of flange 42 overlay the upper edge 44 and openings 48 of transition panel 26. Screws, such as at 36, are then inserted through the screw-receiving holes 52 of flange 42 so as to simultaneously secure the shield and transition panel 26 to the vehicle resulting in an assembled appearance as illustrated fragmentarily in FIGURE 3.

FIGURE 4, a fragmentary cross-sectional view taken on the plane of line 4—4 of FIGURE 3, illustrates the general relationship of the transition panel 26, exhaust pipe assembly 21, flange 42 of shield 24, front fender panel 14 and portions of vehicle body supporting structure 54. As previously stated, and as can best be seen in FIGURE 4, the exhaust pipe assembly 21 is located generally outwardly or outboard of the vehicle 10.

Transition panel 26 is comprised of a main body or plate 56 which is formed so as to be adapted to abut against and closely conform to that portion of the front fender 14 situated in juxtaposition thereto. The conformity of abutting surface 58 of plate portion 56 is illustrated as at FIGURE 4.

Figure 5:
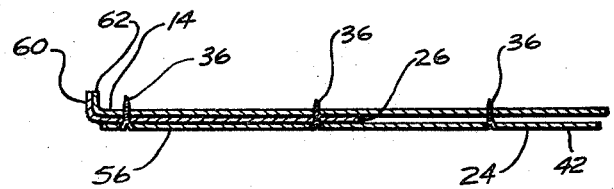
FIGURE 5 is a fragmentary cross-sectional view taken generally on the plane of line 5—5 of FIGURE 3 and looking in the direction of the arrows.

At the forward-most end of the panel plate portion 56, a flange 60 is formed so as to be inwardly directed generally towards the centerline of the vehicle 10. Flange 60 is adapted to engage the edge flange 62 of the fender wheel opening 64 as illustrated in cross-section in FIGURE 5. Both the plate portion 56 as well as flange 62 may extend beneath the otherwise normal lower edge of fender 14 as also generally illustrated by FIGURE 4. As seen in, for example, FIGURES 1 and 3, the frontal or forward edge 66 of panel 26 is contoured so as to present a blending transition from the fender wheel opening 64 to the general horizontally disposed lower edge of shield 24.

Transition panel 26 also carries a bulbous-like portion 70 which, in the form of the invention illustrated, is formed integrally with body or plate portion 56. FIGURES 1 and 3 illustrated the outwardly flaring portion 70 as blending into body 56 in a manner defining, in side elevational view, a bullet-like configuration as outlined generally by the line 72. As best seen in FIGURES 2 and 4, the cross-sectional configuration of the flared out portion 70 is generally arcuate so as to present a continuity of form with the shield 24.

Figure 6:
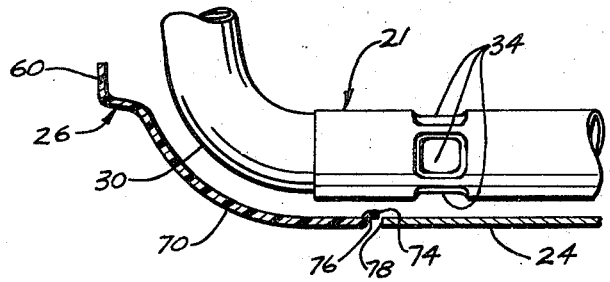
FIGURE 6 is a fragmentary cross-sectional view taken generally on the plane of line 6—6 of FIGURE 3 (with the fragmentary portion of the exhaust pipe shown in elevation) and looking in the direction of the arrows.

As seen in FIGURES 2, 3 and 6, the rearward end of the flared-out section 70 is provided with an arcuate flange portion 74 which is necked-down so as to provide an arcuate step 76 in relation to the flared-out bullet-like portion 70. The step portion 76 is provided in order to enable the front edge 78 of shield 24 to be placed in spaced relationship to the portion 76 and yet have the space therebetween generally filled or blocked by the arcuate flange 74 thereby presenting a substantially continuous appearance as between the transition panel 26 and shield 24.

Figure 9:
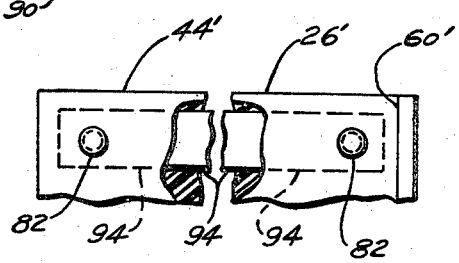
FIGURE 9 is a fragmentary view taken generally in the direction of arrow, A, of FIGURE 8 with certain elements thereof omitted and portions in cross-section for purposes of clarity.
Figure 10:
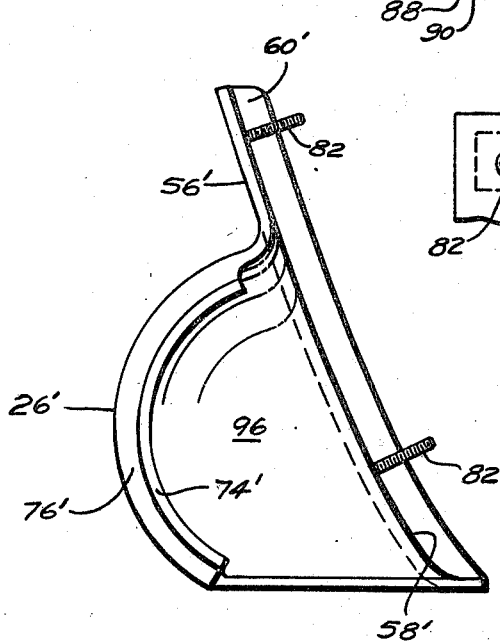
FIGURE 10 is an end-elevational view taken generally in the direction of arrow, B, of FIGURE 7.

The embodiment of the transition panel illustrated in FIGURES 7, 8, 9 and 10 differs from that of the previous figures basically in the means for securing the panel to the vehicle. All elements which are like or similar to those of FIGURES 1 through 6 are identified with like primed reference numerals. The transition panel 26 of FIGURE 2, for example, is adapted for application to a vehicle by means of separate securing means such as screws 36. However, the embodiment of FIGURES 7 through 10 contemplates forming the securing means to the transition panel 26′ as illustrated, for example, by externally threaded studs 82 which are intended to pass through suitable receiving holes 38′ in the fender panel 14′ (FIGURES 7 and 8) and be fastened therein as by cooperating washers 84 and nuts 86. One such successful embodiment of transition panel 26′ was constructed of a plurality of layers of fiber glass (including suitable resins), as generally indicated by the layer portions 88 and 90 in FIGURE 8. In that particular embodiment studs 82 having a head-like retaining portion 92 were secured to the transition panel 26′ by having the head-like retaining portion 92 generally interleaved between the layers of fiber glass. The studs 82, may, of course, have individual head-like retaining portions or, as illustrated in FIGURE 9, the studs 82 may be mounted on a band or common anchoring strip 94 which may also be imbedded within the material forming the transition panel.

It should be evident that even though the transition panel 26 or 26′ has been described as having been constructed of fiber glass that the transition panels can be constructed of many suitable materials among which the groups of plastics and metals are but two. Further, it should be apparent that the transition panels can be formed by any of a number of manufacturing processes. For example, such transition panels are suitable for casting and obviously well suited for stamping operations.

Figure 7:
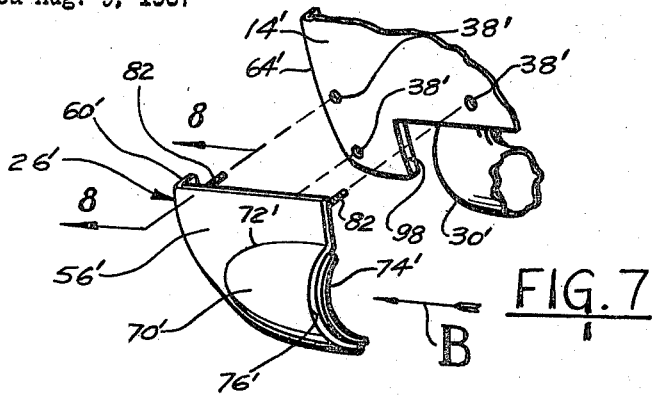
FIGURE 7 is a view similar to FIGURE 2 but illustrating another embodiment of the invention.
Figure 8:
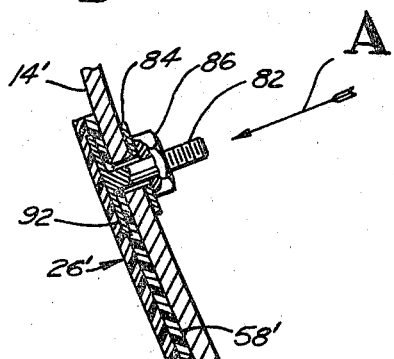
FIGURE 8 is an enlarged fragmentary cross-sectional view taken generally on the plane of line 8—8 of FIGURE 7 and looking in the direction of the arrows.

It should be apparent that having the studs or other fastening means anchored in the material forming the transition panel, will result in the elimination of any outward appearance of any fasteners when the transition panel 26′ is mounted onto the fender 14′ as indicated in FIGURE 7. Of course, when the transition panel 26′ is so mounted against fender 14′ the cavity 96, defined generally by the bulbous potion 76′ is of a size sufficient to accommodate the protrusion presented by the exhaust pipe assembly 30′. Further, as illustrated in FIGURE 7, some vehicles are provided with cut-out portions as at 98 in order to permit the extension therethrough of the exhaust pipe assembly 30′. In such situations the transition panel also serves to cover the cut-out portion 98 as well as accommodate the exhaust pipe assembly 30′.

Further modifications of the invention are of course contemplated. For example, in the embodiments of both FIGURES 2 and 7 the protruding transitional contours 70 and 70′ have been illustrated as being of a somewhat cylindrical cross-section. It should be apparent, in view of the foregoing, however, that the bulbous or transitional portions 70 and 70′ are merely illustrative and that various cross-sectional configurations are not only possible but are very probable especially in instances where the styling of the vehicle generally dictates a particular configuration other than arcuate or generally cylindrical. In fact it is specifically contemplated that the transitional contour such as at 70 or 70′ will in certain instances have a rectangular or square-like cross-sectional configuration when viewed as in planes parallel to the view of FIGURE 4.

Even though only two embodiments have been disclosed and described, it is apparent that other embodiments and modifications of the invention are possible within the scope of the invention. Accordingly, no limitations beyond those as defined by claims herein is intended.

I claim:
1. A transition member for application to an automotive vehicle having a vehicle body panel and an engine exhaust pipe assembly, comprising a body portion adapted to be secured to said vehicle body panel, said body portion including a closely conforming overlying extension and continuation of said vehicle body panel when said body portion is secured to said vehicle body panel, a transitional portion carried by said body portion, said transitional portion extending generally totally outboard of said vehicle body panel when said body portion is secured to said vehicle body panel, said transitional portion also having one end generally blending into and terminating in said body portion, and said transitional portion also including an other end protruding generally away from said body portion and outboard of said vehicle body panel when said body portion is secured to said vehicle body panel, said other end being of a contoured configuration forming a generally open end passageway for accommodating the passage therethrough and generally inboard thereof of at least a portion of said exhaust pipe assembly.

2. A transition member according to claim 1 including means carried by said transition member body portion for securing said transition member to said vehicle body panel.

3. A transition member according to claim 1 wherein said other end of said transitional portion includes an outer configuration which closely approximates the outer configuration of a juxtaposed end of an associated shield for said vehicle exhaust pipe assembly when said outer end of said transitional portion and said juxtaposed end of said shield are placed in general end-to-end relationship.

4. A transition member according to claim 1 wherein said vehicle body panel comprises a front fender panel having an opening formed therein for accommodating a front wheel of said vehicle, including a flange carried by said transition member body portion, said flange being joined at one end to said body portion and having an other end projecting in a direction inboardly of said body portion and said vehicle when said body portion is secured to said body panel, said flange being of substantial length and effective for abutting engagement with an edge of said opening in said front fender panel, said flange when in abutting engagement with said edge of said opening effectively defining a downward extension of said edge in order to blend the contour of said edge with said body portion.

5. A transition member according to claim 4 including a second flange portion carried by said other end of said transitional portion and extending therefrom, said second flange portion being adapted for placement in generally end-to-end relationship with a cooperating exhaust pipe shield member carried by said vehicle.

6. A transition member for application to an automotive vehicle having a vehicle body panel and an engine exhaust pipe assembly, comprising a body portion adapted to be secured to said vehicle body panel, said body portion including an overlying extension and continuation of said vehicle body panel when said body portion is secured to said body panel, a transitional portion carried by said body portion, said transitional portion extending generally totally outboard of said vehicle body panel when said body portion is secured to said vehicle body panel, said transitional portion also having one end generally blending into and terminating in said body portion, said transitional portion also having an other end protruding generally away from said body portion and outboard of said vehicle body panel when said body portion is secured to said vehicle body panel, said transition member being formed of plastic material and including fastener means substantially enveloped and secured against movement within said plastic material for detachably securing said transition member to said vehicle body panel member.

7. A transition member for application to an automotive vehicle having a vehicle body panel and an engine exhaust pipe assembly, comprising a body portion adapted to be secured to said vehicle body panel, said body portion including an overlying extension and continuation of said vehicle body panel when said body portion is secured to said body panel, a transitional portion carried by said body portion, said transitional portion extending generally totally outboard of said vehicle body panel when said body portion is secured to said vehicle body panel, said transitional portion also having one end generally blending into and terminating in said body portion, said transitional portion also having an other end protruding generally away from said body portion and outboard of said vehicle body panel when said body portion is secured to said vehicle body panel, said other end of said transitional portion having a generally arcuate cross-section and therminating in a generally necked arcuate flange portion whereby said flange portion can be placed somewhat within and in close proximity to an exhaust pipe assembly shield member carried by said vehicle and situated in generally end-to-end relationship with said other end of said transitional portion.

8. A transition member for application to an automotive vehicle having a vehicle body panel and an engine exhaust pipe assembly, comprising a body portion adapted to be secured to said vehicle body panel, said body portion including an overlying extension and continuation of said vehicle body panel when said body portion is secured to said vehicle body panel, a transitional portion carried by said body portion, said transitional portion extending generally totally outboard of said vehicle body panel when said body portion is secured to said vehicle body panel, said transitional portion also having one end generally blending into and terminating in said body portion, said transitional portion also having another end protruding generally away from said body portion and outboard of said vehicle body panel when said body portion is secured to said vehicle body panel, said transition body portion being formed to a cross-sectional contour closely approximating the cross-sectional contour of said vehicle body panel, said transitional portion also comprising a bulbous-shaped portion generally intersecting and blending into said body portion so as to thereby define a bullet-shaped side elevational contour flaring outwardly in order to at least partially accommodate a portion of an exhaust pipe assembly passing therethrough.

9. In combination with an automotive vehicle having a vehicle body fender panel and an engine exhaust pipe assembly, a transition member applied to the exterior surface of said fender panel, said transition member comprising a body portion having an inner surface closely conforming to the contour of said exterior surface of said fender panel, said body portion including a forwardly directed end and a rearwardly directed end, a transitional portion carried by said body portion, said transitional portion extending generally totally out of the general plane of said body portion so as to be outboardly directed of said body portion and said fender panel, said transitional portion also having a first end generally blending into and terminating in said body portion in the vicinity of said forwardly directed end, said transitional portion also including an other end at least near said rearwardly directed end contoured to be protruding outboardly of said body portion and said fender panel, said other end defining a generally open end and said transitional portion between said first end and said open end defining inboardly thereof a passageway for accommodating the passage therethrough of a portion of said exhaust pipe assembly.

References Cited

UNITED STATES PATENTS

| | | | |
|---|---|---|---|
| 3,140,891 | 7/1964 | Shreffler | 296—1 |
| D. 112,482 | 12/1938 | Koch | 181—72 |
| 2,902,102 | 9/1959 | Gorman et al. | 180—64 |
| 3,043,097 | 7/1962 | Inman et al. | 181—72 |
| 3,095,058 | 6/1963 | Woytowich | 180—64 |

OTHER REFERENCES

1967 Chevrolet Chassis Service Manual copyright 1966, section 8–25, fig. 31 (Corvette Exhaust).

LEO FRIAGLIA, Primary Examiner

JOHN A. PEKAR, Assistant Examiner

U.S. Cl. X.R.

296—28